(12) United States Patent
Chen et al.

(10) Patent No.: US 6,542,400 B2
(45) Date of Patent: Apr. 1, 2003

(54) MOLECULAR MEMORY SYSTEMS AND METHODS

(75) Inventors: Yong Chen, Redwood City, CA (US); Robert G. Walmsley, Palo Alto, CA (US)

(73) Assignee: Hewlett-Packard Development Company LP, Houston, TX (US)

( * ) Notice: Subject to any disclaimer, the term of this patent is extended or adjusted under 35 U.S.C. 154(b) by 0 days.

(21) Appl. No.: 09/819,402

(22) Filed: Mar. 27, 2001

(65) Prior Publication Data

US 2002/0172072 A1 Nov. 21, 2002

(51) Int. Cl.[7] .............................................. G11C 11/00
(52) U.S. Cl. ........................ 365/151; 365/118; 365/217
(58) Field of Search ................................ 365/151, 118, 365/189.01, 217; 716/9; 369/126, 53.38, 128; 428/64.4; 346/153.1

(56) References Cited

U.S. PATENT DOCUMENTS

| | | | |
|---|---|---|---|
| 3,833,894 A | | 9/1974 | Aviram et al. |
| 4,188,434 A | * | 2/1980 | Loran .......................... 360/134 |
| 5,038,322 A | | 8/1991 | Van Loenen |
| 5,264,876 A | * | 11/1993 | Kawade et al. .......... 346/153.1 |
| 5,447,767 A | * | 9/1995 | Tanabe et al. ............. 428/64.4 |
| 5,453,970 A | | 9/1995 | Rust et al. |
| 5,535,185 A | | 7/1996 | Kishi et al. |
| 5,547,774 A | | 8/1996 | Gimzewski et al. |
| 5,623,476 A | * | 4/1997 | Eguchi et al. ............... 365/151 |
| 5,801,472 A | | 9/1998 | Wada et al. |
| 5,812,516 A | | 9/1998 | Nose et al. |
| 5,930,162 A | | 7/1999 | Peterson |
| 6,062,931 A | | 5/2000 | Chuang et al. |
| 6,128,214 A | | 10/2000 | Kuekes et al. |
| 6,136,208 A | | 10/2000 | Chou et al. |
| 6,159,742 A | | 12/2000 | Lieber et al. |
| 6,195,313 B1 | | 2/2001 | Seki et al. |
| 6,246,652 B1 | * | 6/2001 | Kikukawa et al. .......... 369/128 |
| 6,256,767 B1 | * | 6/2001 | Kuekes et al. ................. 716/9 |
| 2001/0006744 A1 | * | 7/2001 | Saito ........................... 147/33 |

FOREIGN PATENT DOCUMENTS

EP 0325056 7/1989

* cited by examiner

Primary Examiner—David Lam

(57) ABSTRACT

A molecular memory system that includes a protective layer that is disposed over a molecular recording layer is described. The protective layer enables a scanning probe to write information to and read information from a molecular memory element by direct electrical contact without substantial risk of damage to either the scanning probe or the molecular recording medium. In this way, the invention avoids the high emission currents, which may damage the probe electrode or the recording media, or both, and avoids other difficulties often associated molecular memory systems with non-contacting probe electrodes.

21 Claims, 3 Drawing Sheets

MOLECULAR MEMORY SYSTEMS AND METHODS

CROSS-REFERENCE TO RELATED APPLICATIONS

This application is related to U.S. application Ser. No. 09/282,048, filed on Mar. 29, 1999, by James R. Heath et al., and entitled "Chemically Synthesized and Assembled Electronic Devices," and to U.S. application Ser. No. 09/815,844, filed Mar. 21, 2001 by Yong Chen et al., and entitled "Fabricating A Molecular Memory Device Having A Protective Barrier Layer," both of which are incorporated herein by reference.

TECHNICAL FIELD

This invention relates to molecular memory systems and methods.

BACKGROUND

Many different molecular electronic logic and memory devices have been proposed.

For example, in one molecular memory device structure, a molecular layer (e.g., a Langmuir-Blodgett film) is sandwiched between a pair of electrically conducting layers (e.g., a pair of metal layers, a metal layer and a doped semiconductor layer, or a pair of doped semiconductor layers). The molecular layer serves as a thin insulating film that may be used in a metal-insulator-metal (MIM) structure, which may be configured as a tunnel junction device or a switching device, or a metal-insulator-semiconductor (MIS) structure, which may be configured as a logic and memory device.

U.S. Pat. No. 6,128,214 describes another molecular memory device structure that is configured as a molecular electrode crossbar memory (MWCM) system formed from a two-dimensional array of nanometer-scale devices. Each MWCM device is formed at the crossing point (or junction) of a pair of crossed electrodes where at least one molecular connector species operates as a bi-stable molecular switch between the pair of crossed electrodes. The resulting device structure may be configured as a resistor, a diode or an asymmetric non-linear resistor. The state of each MWCM device may be altered by applying a relatively high state-changing voltage and may be sensed with a non-state-changing (or non-destructive) voltage.

U.S. Pat. No. 5,812,516 describes a molecular memory system in which a scanning tunneling microscope probe electrode (or an atomic force microscope probe electrode) is scanned directly above a molecular recording layer and is used to emit electrical signals for writing information to and reading information from localized areas of the molecular recording medium. In operation, the distance between the probe electrode and the recording medium is maintained constant (e.g., on the order of 1 nm) based upon a detected displacement of the probe electrode caused by an interatomic force acting between the probe electrode and the recording medium. In this way, damage that might be caused by contact between the probe electrode and the recording medium may be avoided.

Still other molecular memory systems and devices have been proposed.

SUMMARY

The invention features a novel molecular memory system that includes a protective layer that is disposed over a molecular recording layer to enable a scanning probe to write information to and read information from a molecular memory element by direct electrical contact without substantial risk of damage to either the scanning probe or the molecular recording medium. In this way, the invention avoids the high emission currents, which may damage the probe electrode or the recording media, or both; and avoids other difficulties often associated molecular memory systems with non-contacting probe electrodes.

In one aspect, the invention features a molecular memory system that includes a first electrode structure, a second electrode structure, and a recording medium having a molecular recording layer disposed between the first electrode structure and the second electrode structure. The second electrode structure has a substantially planar protective surface exposed for contact with a probe tip and comprises an array of spaced-apart electrodes separated by electrically insulating material.

Embodiments in accordance with this aspect of the invention may include one or more of the following features.

The molecular recording layer preferably comprises a switchable molecular species (e.g., a rotaxane molecular species). The molecular recording layer preferably has a memory property selectively holding first and second memory states with different current-voltage characteristics and preferably exhibits transition between the first and second memory states upon application of a state-changing voltage across the recording layer. The first electrode structure preferably comprises metal layer disposed over a substrate. The second electrode structure preferably comprises an array of spaced-apart metal electrodes separated by a metal oxide (e.g., aluminum electrodes separated by aluminum oxide).

In some embodiments, the molecular memory system includes a probe tip that is configured to contact the exposed substantially planar protective surface of the second electrode structure. The probe tip preferably comprises a carbon nanotube. A scanning assembly may include an array of probe tips, each of which is configured to contact the exposed substantially planar protective surface of the second electrode structure. An actuator may be coupled to the array of probe tips and may be configured to adjust the position of the probe tips to maintain contact between each probe tip and the exposed substantially planar surface of the second electrode structure. The scanning assembly preferably is configured to scan the probe tip array across the exposed substantially planar protective surface of the second electrode structure. A read/write controller preferably is configured to control the application of voltage signals through the scanning assembly probe tips and between the first electrode structure and the electrodes of the second electrode structure. The read/write controller preferably is configured to control application of a sensing voltage for determining a local memory state of the molecular recording layer and to control the application of a state-changing voltage for changing a local memory state of the molecular recording layer.

In some embodiments, a lubricant is disposed over the exposed substantially planar protective surface of the second electrode structure.

In another aspect, the invention features a method of making the above-described molecular memory system.

In another aspect of the invention, a probe array is contacted against the exposed substantially planar protective surface of the second electrode structure of the above-described molecular memory system, and the contacting probe tip array is scanned across the exposed substantially planar protective surface of the second electrode structure.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
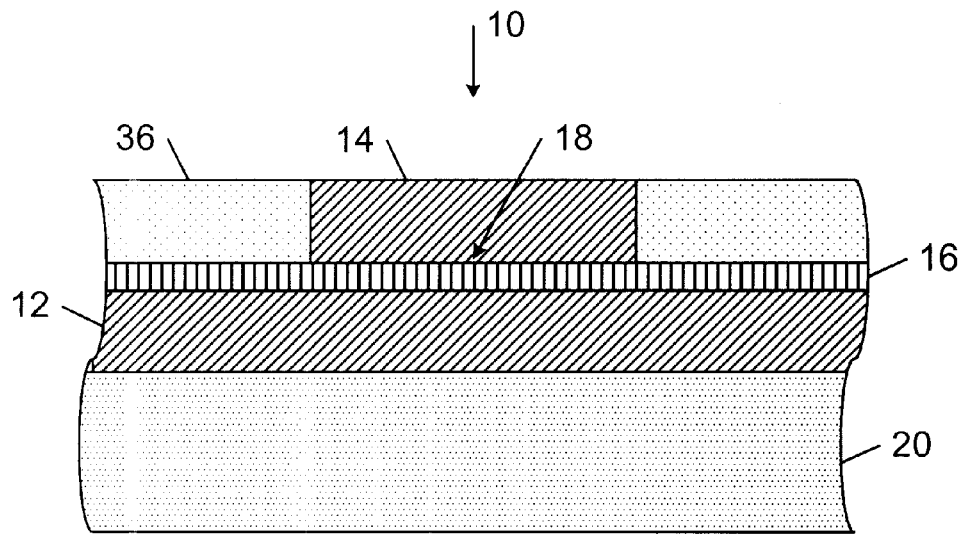
FIG. 1 is a diagrammatic cross-sectional side view of a molecular memory device that is formed from at least one electrically addressable molecular species that is sandwiched between two overlapping electrically conductive electrodes.

Referring to FIG. 1, in one embodiment, a molecular memory device (or molecular memory element) 10 includes two electrically conducting electrodes 12, 14 and a layer 16 of switchable molecules or molecular compounds that is sandwiched between electrodes 12, 14. The particular molecule or molecules 18 that are located at the junction of electrodes 12, 14 act as switch molecules and correspond to the active portion of molecular memory device 10. In operation, the state of molecular memory device 10 may be changed by applying a relatively high state-changing voltage across electrodes 12, 14. The magnitude of the state-changing voltage is sufficient to oxidize or reduce switch molecules 18. Switch molecules 18 may include a redox pair of molecular species that cooperate to balance charge such that when one of the molecular species is oxidized (or reduced), the other molecular species is reduced (or oxidized). In operation, in one example, one molecular species may be reduced and the associated molecular species (the other half of the redox pair) may be oxidized. In another example, one molecular species may be reduced and one of the electrodes 12, 14 may be oxidized. In a third example, one molecular species may be oxidized and one of the electrodes 12, 14 may be reduced. In a fourth example, one electrode may be oxidized and an oxide associated with the other electrode may be reduced. In each of these examples, oxidation or reduction affects the tunneling distance or the tunneling barrier height between the two electrodes, thereby exponentially altering the rate of charge transport across the electrode junction. This electronic functionality serves as the basis for operating molecular memory device 10 as an electrical switch.

Electrodes 12, 14 each may be formed from an electrically conducting metal or a doped semiconductor material. Electrodes 12, 14 may be deposited onto a substrate 20 by a conventional thin film deposition process, including a physical film deposition process (e.g., magnetron sputtering or electron beam deposition) or a chemical film deposition process (e.g., chemical vapor deposition).

Molecular layer 16 may be formed from a variety of different switchable molecular species (e.g., one or more of the rotaxane molecules described in U.S. application Ser. No. 09/282,048, filed on Mar. 29, 1999, which is incorporated herein by reference). Other molecular species (e.g., the molecular recording medium compounds described in U.S. Pat. No. 5,812,516, which is incorporated herein by reference) also may be used. In some embodiments, the selected molecular species may be dissolved in a solvent (e.g., tetrahydrofuran), prepared as a Langmuir monolayer, and transferred as a Langmuir-Blodgett single molecular monolayer film 16 over bottom electrode 12. In other embodiments, a suitable molecular species may be deposited directly onto substrate 20.

Top electrode 14 is surrounded by insulating material 36, which may be formed from any suitable electrically insulating material, including a metal or semiconductor oxide. In some embodiments, top electrode 14 may be formed by converting regions of a top layer from one electrical conductivity type to another. For example, in one embodiment, the top layer is formed from an electrical conductor (e.g., aluminum or titanium) and insulating regions 36 are converted to an electrical insulator by a conventional oxidation process. In another embodiment, the top layer is formed from an electrical insulator (e.g., an electrical antifuse structure), in which case a region corresponding to top electrode 14 is converted to an electrical conductor.

Substrate 20 may be formed from an insulating material, for example, an oxide layer formed on a semiconductor substrate (e.g., a silicon dioxide ($SiO_2$) layer that is formed on a silicon substrate) or sapphire.

Depending upon the molecules or materials selected for molecular layer 16, molecular memory device 10 may exhibit any one of a variety of different electrical switching functions that may be used to controllably connect or disconnect bottom electrode 12 and top electrode 14. The molecular memory device may be singly configurable or reconfigurable. In singly configurable embodiments, the initial state of molecular memory device 10 may be open or closed. In reconfigurable embodiments, the switching device may be opened and closed multiple times by cycling the polarity and the magnitude of the applied voltage beyond appropriate threshold values that are selected to reversibly oxidize and reduce the active material or molecules 18.

In general, the type of electrical connection formed between bottom electrode 12 and top electrode 14 depends upon the materials from which electrodes 12, 14 and molecular layer 16 are formed. Table 1 identifies the various types of electrical switching functions that may be obtained from different device material combinations.

TABLE 1

| Device Type | Electrode Materials | | | | |
|---|---|---|---|---|---|
| | Metal-Metal (same) | Metal-Metal (different) | Metal-Semiconductor | Semiconductor-Semiconductor (pn junction) | Semiconductor Semiconductor (heterojunction) |
| Resistor | X | X | X | | |
| Tunneling Resistor | X | X | X | | |
| Resonant Tunneling Resistor | X | X | X | | |
| Diode | | X | X | X | X |
| Tunneling Diode | | X | X | X | |
| Resonant Tunneling Diode | | X | X | X | X |
| Battery | | X | X | | X |

Figure 2:
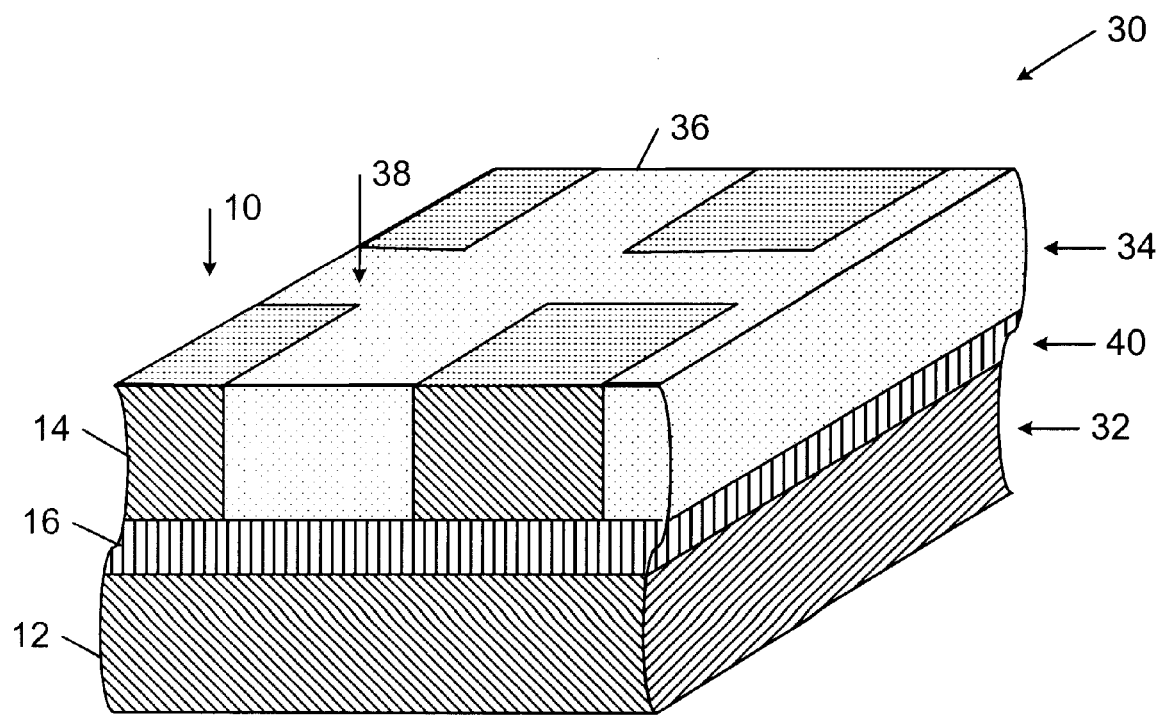
FIG. 2 is a diagrammatic perspective view of a portion of a molecular memory that includes an array of memory devices each having a structure corresponding to the molecular memory device of FIG. 1.

As shown in FIG. 2, in one embodiment, a molecular memory 30 may be formed from an array of memory elements each having the structure of molecular memory device 10. In particular, molecular memory system 30 includes a first electrode structure 32 that corresponds to electrode 12, which serves as a common electrode for each of the memory elements. Molecular memory system 30 also includes a second electrode structure 34 that includes an array of spaced-apart electrodes 14 separated by electrically insulating material 36 and has a substantially planar protective surface 38 that is exposed for contact with a scanning probe tip. A recording medium 40, which corresponds to molecular layer 16, is disposed between first electrode structure 32 and second electrode structure 34.

Figure 3:
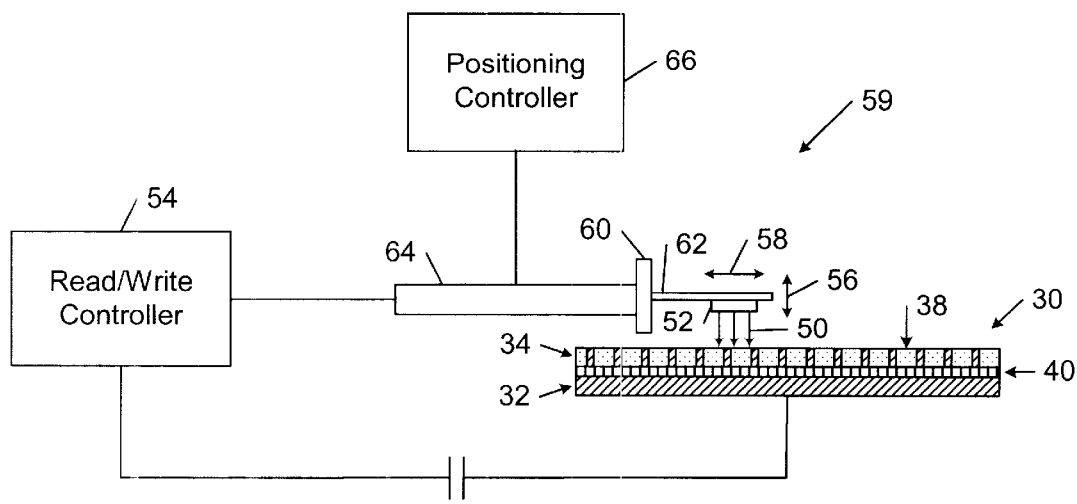
FIG. 3 is a diagrammatic side view of a molecular memory system that includes an assembly for scanning a probe tip array across the exposed substantially planar protective surface of the memory device array of FIG. 2.

Referring to FIG. 3, in one embodiment, information may be written into and read from molecular memory 30 with one or an array of probe tips 50 that are supported by a scanning head 52. A read/write controller 54 controls the application of voltage signals through probe tips 50 and between first electrode structure 32 and the electrodes 14 of second electrode structure 34. As shown by arrows 56, 58, scanning head 52 is mounted on a scanning assembly 59 that is configured to precisely move scanning head 52 over the exposed substantially planar protective surface 38 of second electrode structure 34. In particular, scanning head 52 may be moved vertically by a z-axis scan actuator 60 and may be moved horizontally by an x-y axis scan actuator 62. Z-axis scan actuator 60 and x-y axis scan actuator 62 are carried by a support arm 64. A positioning controller 66 controls the vertical and horizontal positions of probe tips 50 over surface 38. In operation, positioning controller 66 may lower probe tips 50 vertically into contact with surface 38. Subsequently, positioning controller 66 may scan the contacting probe tips 50 horizontally across surface 38. After one or more probe tips 50 are positioned over a respective number of electrodes 14, read/write controller 54 may write information into the corresponding memory elements by applying across the memory elements a relatively high state-changing voltage that is selected to change the local memory states of the memory elements. Alternatively, read/write controller 54 may read information stored in the corresponding memory elements by applying across the memory elements a relatively low sensing voltage that is selected to provide information about the electrical current conducting properties of the memory elements without changing their memory states.

Scanning assembly 59 may be implemented as a conventional scanning tunneling microscope (STM) scanning assembly, in which the positions of probe tips 50 are controlled based upon tunneling current information. Alternatively, scanning assembly 59 may be implemented as an atomic force microscope (AFM) scanning assembly, in which the positions of probe tips 50 are controlled based upon a force (e.g., an atomic force, an electrostatic force, or a magnetic force) that is generated between probe tips 50 and the exposed substantially planar protective surface 38 of second electrode structure 34. Z-axis scan actuator 60 and x-y axis scan actuator 62 may be implemented as planar electrostatic actuators (see, e.g., U.S. Pat. Nos. 6,136,208 and 5,801,472, which are incorporated herein by reference).

Figure 4A:
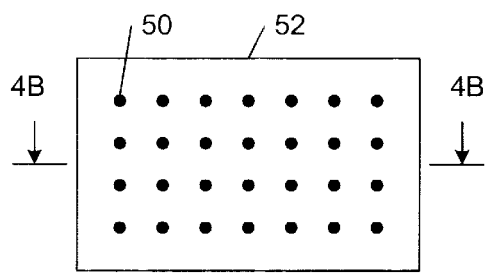
FIGS. 4A and 4B are, respectively, a diagrammatic bottom view and a diagrammatic cross-sectional side view of a probe tip array of the scanning probe tip assembly of FIG. 3.
Figure 4B:
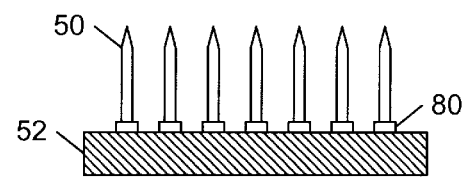

As shown in FIGS. 4A and 4B, scanning head 52 may support a regular array of probe tips 50 with a probe tip spacing that preferably corresponds to $10-10^4$ times the spacing between memory elements 10 of molecular memory 30. Probe tips 50 may be formed from a durable, resilient and electrically conductive material, including a metallic material (e.g., platinum) or non-metallic material (e.g., carbon). In one embodiment, probe tips 50 are carbon nanotubes. As used herein, the term "nanotube" means a hollow article having a narrow dimension (diameter) of about 1–200 nm and a long dimension (length), where the ratio of the long dimension to the narrow dimension (i.e., the aspect ratio) is at least 5. In general, the aspect ratio may be between 5 and 2000. A carbon nanotube is a hollow structure that is formed from carbon atoms. In this embodiment, each probe tip 50 may be either a multi-walled nanotube (MWNT) or a single-walled nanotube (SWNT). A MWNT includes several nanotubes each having a different diameter. Thus, the smallest diameter tube is encapsulated by a larger diameter tube that, in turn, may be encapsulated by another larger diameter nanotube. A SWNT, on the other hand, includes only one nanotube. MWNTs typically are produced either as single MWNTs or as bundles of MWNTs. SWNTs, on the other hand, typically are produced as ropes of SWNTs, where each strand of the rope is a SWNT. The carbon nanotube probe tips 50 may be grown by a conventional carbon nanotube fabrication process (e.g., chemical vapor deposition).

As shown in FIG. 4B, a planar actuator 80 is positioned at the base of each probe tip 50 and is configured to maintain each probe tip 50 in contact with surface 38. The carbon nanotube probe tips 50 may have the same or different lengths. During scanning, planar actuator 80 is configured to adjust the position of each probe tip 50 to accommodate the respective probe tip lengths so as to maintain contact between the probe tips 50 and surface 38.

Figure 5:
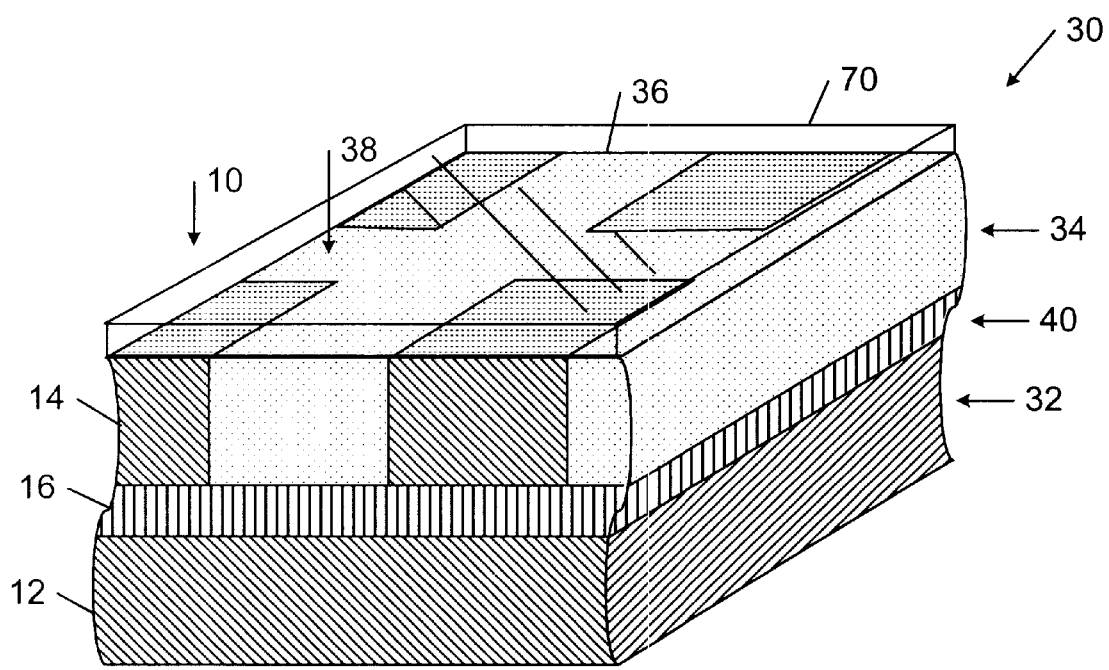
FIG. 5 is a diagrammatic perspective view of the portion of the memory device array of FIG. 2 with a lubricant layer disposed over an exposed substantially planar surface.

Referring to FIG. 5, in one embodiment, a lubricant layer 70 may be disposed over the exposed substantially planar protective surface 38 of second electrode structure 34. Lubricant layer 70 may be formed from any suitable electrically non-conducting solid or liquid material that reduces the interaction energy between probe tips 50 and surface 38. For example, lubricant 70 may be a graphite layer that is thermally evaporated over surface 38. Other material compositions also may be used. By reducing the interaction energy between the contacting probe tips 50 and surface 38, lubricant layer 70 reduces wear of and the likelihood of damage to probe tips 50 and surface 38 during use.

Other embodiments are within the scope of the claims. For example, the above-described molecular memory devices may be implemented in a circuit designed to perform one or more logic (as opposed to memory) functions.

Still other embodiments are within the scope of the claims.

What is claimed is:

1. A molecular memory system, comprising:

a first electrode structure;

a second electrode structure having a substantially planar protective surface exposed for contact with a probe tip and comprising an array of spaced-apart electrodes separated by electrically insulating material; and a recording medium having a molecular recording layer disposed between the first electrode structure and the second electrode structure.

2. The molecular memory system of claim 1, wherein the molecular recording layer comprises a switchable molecular species.

3. The molecular memory system of claim 2, wherein the molecular recording layer comprises a rotaxane molecular species.

4. The molecular memory system of claim 1, wherein the first electrode structure comprises metal layer disposed over a substrate.

5. The molecular memory system of claim 1, wherein the second electrode structure comprises an array of spaced-apart metal electrodes separated by a metal oxide.

6. The molecular memory system of claim 5, wherein the metal electrodes are formed from aluminum and the metal oxide is aluminum oxide.

7. The molecular memory system of claim 1, further comprising a probe tip configured to contact the exposed substantially planar protective surface of the second electrode structure.

8. The molecular memory system of claim 7, wherein the probe tip comprises a carbon nanotube.

9. The molecular memory system of claim 1, further comprising a scanning assembly comprising an array of probe tips, each configured to contact the exposed substantially planar protective surface of the second electrode structure.

10. The molecular memory system of claim 9, further comprising an actuator coupled to the array of probe tips and configured to adjust the position of the probe tips to maintain contact between each probe tip and the exposed substantially planar surface of the second electrode structure.

11. The molecular memory system of claim 9, wherein the scanning assembly is configured to scan the probe tip array across the exposed substantially planar protective surface of the second electrode structure.

12. The molecular memory system of claim 11, further comprising a read/write controller configured to control the application of voltage signals through the scanning assembly probe tips and between the first electrode structure and the electrodes of the second electrode structure.

13. The molecular memory system of claim 12, wherein the molecular recording layer has a memory property selectively holding first and second memory states with different current-voltage characteristics and exhibits transition between the first and second memory states upon application of a state-changing voltage across the recording layer.

14. The molecular memory system of claim 13, wherein the read/write controller is configured to control application of a sensing voltage for determining a local memory state of the molecular recording layer and to control the application of a state-changing voltage for changing a local memory state of the molecular recording layer.

15. The molecular memory system of claim 1, further comprising a lubricant disposed over the exposed substantially planar protective surface of the second electrode structure.

16. A molecular memory method, comprising:

providing a first electrode structure;

disposing over the first electrode structure a recording medium having a molecular recording layer; and disposing over the recording medium a second electrode structure having a substantially planar protective surface exposed for contact with a probe tip and comprising an array of spaced-apart electrodes separated by electrically insulating material.

17. A molecular memory method, comprising:

providing a molecular memory system comprising
      a first electrode structure,
      a second electrode structure having an exposed substantially planar protective surface and comprising an array of spaced-apart electrodes separated by electrically insulating material, and
      a recording medium having a molecular recording layer disposed between the first electrode structure and the second electrode structure;

contacting a probe array against the exposed substantially planar protective surface of the second electrode structure; and scanning the contacting probe tip array across the exposed substantially planar protective surface of the second electrode structure.

18. The molecular memory method of claim 17, wherein the probe tip array comprises an array of carbon nanotubes.

19. The molecular memory method of claim 17, wherein the molecular recording layer has a memory property selectively holding first and second memory states with different current-voltage characteristics and exhibits transition between the first and second memory states upon application of a state-changing voltage across the recording layer.

20. The molecular memory method of claim 19, further comprising applying across the molecular recording layer a sensing voltage for determining a local memory state of the molecular recording layer.

21. The molecular memory method of claim 19, further comprising applying across the molecular recording layer a state-changing voltage for changing a local memory state of the molecular recording layer.

* * * * *